July 21, 1942.                F. W. SCHWINN                2,290,451
                    BICYCLE HUB AND METHOD OF MAKING IT
                            Filed Aug. 2, 1939
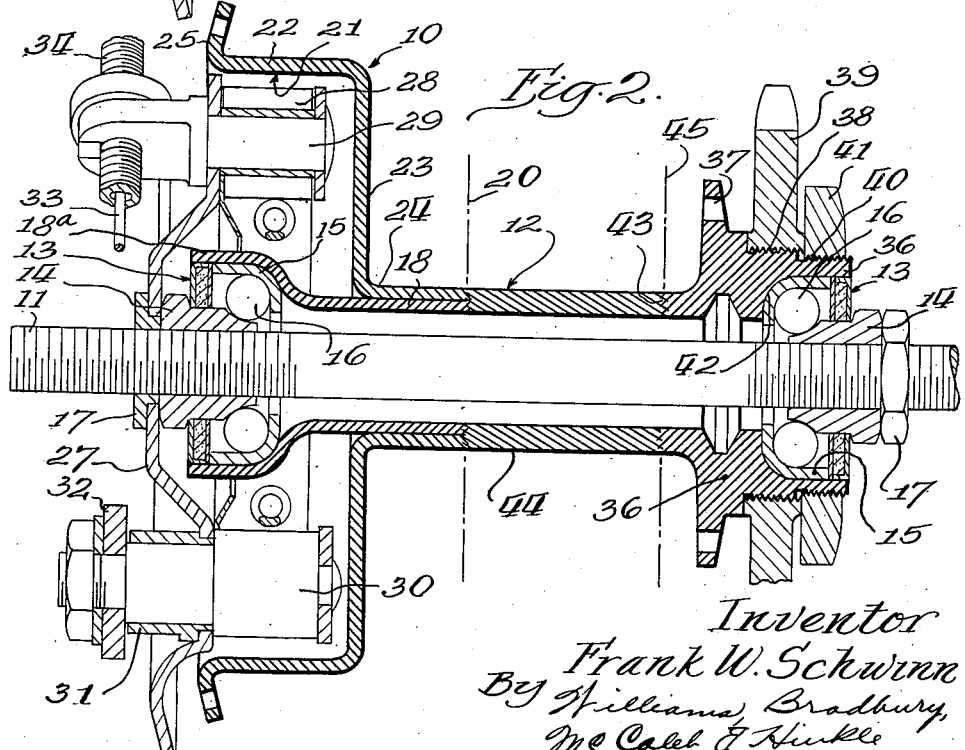
Inventor
Frank W. Schwinn
By Williams, Bradbury,
McCaleb & Hinkle
Attys.

Patented July 21, 1942

2,290,451

UNITED STATES PATENT OFFICE 2,290,451

BICYCLE HUB AND METHOD OF MAKING IT

Frank W. Schwinn, Chicago, Ill.

Application August 2, 1939, Serial No. 287,899

18 Claims. (Cl. 29—159.3)

My invention relates to bicycle hubs and the method of making them. It is especially concerned with a bicycle hub (more properly hub shell) belled at the end to receive the hub bearings and carrying a brake drum for a brake of the automotive type as distinguished from one of the coaster brake type.

My invention is particularly concerned with the structural design of such a bicycle hub which is sturdy and yet economical, and also with an improved method of fabricating such a hub.

More specifically, my invention is concerned with a hub of this type formed from three main portions—a left hub half, a right hub half, and a drum—arranged to be welded together in a single operation and yet provide stock of equal thicknesses on both sides of the plane of weld.

The foregoing together with further objects, features, and advantages of my invention are set forth in the following description of specific embodiments thereof and illustrated in the accompanying drawing wherein Fig. 1 is a vertical axial section of a bicycle hub assembly employing the hub of my invention and fabricated according to my method, and Fig. 2 is a similar view of a modified form of hub assembly which includes a drive sprocket as in the instance of a rear hub.

Referring first to Fig. 1 which is typical of a front wheel hub, the hub assembly as a whole is indicated at 10. It includes an axle 11 on which the hub proper 12 is journaled by means of bearings 13. Each bearing comprises a cone 14, a cup 15 and an annular set of balls 16. As usual, the cones 14 are threaded on the axle and fixed by lock nuts 17. The hub 12 comprises a left half 18 and a right half 19 joined in the plane 20, which is at a normal to the axis. The outer end of each half of the hub is belled as at 18a, 19a to receive the associated bearing cup 15.

The brake drum 21, which is carried by the hub, comprises a drum rim 22, a web or disc portion 23, and a tubular hub-like portion 24 in which the inner end of the left half 18 of the hub is received.

The opposite edge of the drum rim 22 is flanged outwardly to provide one of the spoke flanges 25 for the wheel, while the opposite end of the right half 19 of the flange, at its belled end 19a, is flanged outwardly to provide the other spoke flange 26.

The fixed plate or disc 27 for the brake is mounted on the axle between the adjacent bearing cone 14 and its lock nut. It includes an arm (not shown) extending to an anchorage on the bicycle frame (the fork in the instance of the front wheel). In practice the plate 27 may be fixed to, or made integral with, the adjacent lock nut 17, the bearing take-up adjustment being made wholly by the other lock nut and cone.

A pair of internal expanding brake shoes 28 are pivotally mounted on the pivot stud 29 carried by the plate 27. They are spread apart in applying the brake by a cam 30 journaled in a tubular bearing 31 carried by the plate 27 and actuated by an external arm 32. The end of the arm 32, it will be understood, is connected to the end of a control cable 33, the casing 34 for which is anchored on the outer end of the stud 29.

Having now generally described the hub and the environment in which it is used, I shall now describe in greater detail the structure of my improved hub itself and the method by which it is made.

Except for their belled ends, the right and left hub halves 18 and 19 are straight tubes. Preferably, however, the tubes are not of the same diameter, the right half 19 being of a little greater diameter so that its inside diameter is substantially the same as the outside diameter of the left half. The tubular hub-like portion 24 of the drum is of about the same thickness and diameter as the tubular portion of the left half 18 of the hub so that their adjacent ends register. I prefer that the inner end of the tubular hub-like portion 24 of the drum and the inner end of the left half 18 of the hub terminate in the plane 20, although I contemplate that they may terminate in axially offset relation with a resulting overlap or telescoping at the junction.

If the tubular hub-like portion 24 of the drum, with the inner end of the left hub half 18 pressed therein, were brought into endwise abutment with the inner end of the right hub half 19 for welding in the plane 20, the stock at the end of the right hub half 19 would be only half the thickness of the two-ply stock presented by the hub-like portion 24 and the left hub half 18. That would not make a very satisfactory weld; the weld will be much better if the abutting end faces are equal and in register. To procure this welding advantage as well as to strengthen the hub structurally at the weld, despite this essential three-piece design of the hub and drum sub-assembly, I employ an auxiliary tubular member 35 which is a short section of tubular stock of the same thickness and diameter as the tubular portion of the left hub half 18 and which is pressed into the inner end of the right hub half 19 with the inner end of the auxiliary tubular member 35 coming in the plane 20. In this way the butt faces to be welded are of the same thickness, are of the same diameter, and are in register.

In assembling my combined hub and drum, the drum and left hub half 18 are first telescoped into the sub-assembly shown, and the right hub half 19 and the auxiliary tubular member 35 are telescoped into the other sub-assembly. Then they are brought together in a suitable fixture with their inner ends abutting in the plane 20, registry and alignment being secured by arbor means or other suitable expedient. The two sub-assemblies are then butt welded. This is preferably accomplished by pressing the two sub-assemblies together to provide pressure at the plane of weld and letting the sub-assemblies themselves constitute the electrodes for the welding.

This butt welding will, in practice, suffice ruggedly to secure all four parts to each other, although I contemplate that, if desired in some instances, separate welds may be employed to secure the drum to the left hub half 18 and to secure the auxiliary tubular member 35 to the right hub half 19. Flash welding or shot welding may be employed in lieu of the butt welding, but the butt welding is preferable because it gives a strong weld, preserves greater neatness of appearance, and is a quicker and simpler operation.

In case the adjacent butt faces of all four members do not come in the common plane 20 but instead the abutment between the left hub half 18 and the auxiliary tubular member 35 comes in a plane axially spaced from the plane of the abutment between the drum and the right hub half 19 so that there is a telescoping of the two sub-assemblies, the same butt welding technique may be employed as a single welding operation, although the weld will come in two planes as well as, perhaps, along the cylindrical region of overlap.

It will be seen that by my method and design all of the three essential parts of the hub unit—the left hub half, the right hub half, and the drum—may be readily and economically drawn from sheet stock, since none of the three pieces has to be belled or flanged at more than one end.

By my design and method I obviate the necessity and attendant cost of separately welding or brazing the drum to the half of the hub which carries it. Also, I achieve a butt weld of the two hub halves of twice the thickness, and hence approximately twice the strength which would be secured if the two hub halves alone were butt welded together.

In Fig. 2 I have shown a modification which better solves the peculiar problem of a rear wheel hub which must make provision for mounting the drive sprocket. Because the hub must afford a threaded mounting for the drive sprocket as well as the threaded mounting for the lock nut for the sprocket and because the adjacent spoke flange comes axially inwardly of the sprocket, it is preferable to form this end of the hub as a turned or screw machine part rather than forming it as a stamping. But because these turned or screw machine parts are relatively expensive, I prefer to form as little as possible of the hub from them, using for the remainder of the hub parts, which are relatively inexpensive, stamped or tubular stock. It is also advisable from the manufacturing standpoint to employ as many pieces as possible which may be used either for front or rear hubs, thereby reducing tooling costs and inventory.

Accordingly, in the rear hub modification of Fig. 2, the drum piece 21 and the left hub half 18 remain identical with those of Fig. 1. The right hub end 36 is a screw machine part turned to provide a spoke flange 37, a threaded seat 38 for a sprocket 39, a threaded seat 40 for the sprocket lock nut 41, and an internal set 42 for the bearing cup 15. The inner end of the turned piece 36 is conformed to present an end face 43 of diameter and thickness equal to that of the end face of the combined left hub half 18 and drum. But instead of extending the inner end of the turned piece to the plane 20, for direct butt welding to the sub-assembly, I keep the inner end face 43 relatively close to the spoke flange 37 and bridge the intervening gap with a filler or extension section 44 of tubular stock of thickness and diameter agreeing with the inner end face 43 and the inner end face of the previously mentioned sub-assembly. With this construction I butt weld both in plane 20 and plane 45, the latter being coincident with the face 43. Welds in the two planes 20 and 45 may be effected simultaneously as a single welding operation.

I claim:

1. A combined hub and brake drum unit for a bicycle wheel comprising axial left and right hub halves of tubular form belled at their outer ends to embrace hub bearings, a drum having a tubular hub-like portion, one of the hub halves having a telescopic fit within the hub-like portion, the inner end of the other hub half being of thickness and diameter substantially that of the hub-like portion, and a tubular filler section having a telescopic fit within the end of the last mentioned hub half and being of thickness and diameter substantially that of the inner end of the hub half which is in the drum, the hub-like portion of the drum, the two hub halves, and the filler section being disposed with their inner ends abutting in a common plane and a butt weld uniting them at said plane.

2. A combined hub and brake drum unit for a bicycle wheel comprising a first sub-assembly comprising a drum having a hub-like portion and a first tubular hub section fitted thereinto and a second sub-assembly comprising a second tubular hub section and a filler ring fitted therein, the two sub-assemblies being disposed co-axially with their inner ends of their above-mentioned parts terminating in a common plane and presenting registering end faces of substantially equal thicknesses and diameters, and an annular butt weld in said common plane securing the two sub-assemblies together.

3. The combination with an end half of a bicycle hub, which half comprises a tubular section belled at its outer end to embrace a hub bearing,— of a brake drum having a web, a drum face extending outwardly from the web, and a hub-like portion extending inwardly from the web and into which the tubular section fits with the inner ends of the tubular section and hub-like portion terminating in a common plane to present an end face of double thickness joined by a butt weld to the inner end of another hub half.

4. A combined hub and brake drum unit for a bicycle wheel comprising a hub formed of right and left halves, each hub half having a tubular section at its inner end and a bell at its outer end for embracing the hub bearings, and a drum having a hub-like portion into which the tubular inner end section of one of the hub halves is fitted with the inner ends of the hub-like portion and of the latter hub half terminating in a common plane, and an annular weld in the common plane uniting the drum and hub halves.

5. A combined brake drum and bicycle hub comprising tubular right and left hub halves, a brake drum having a central inwardly extending hub-like portion, the left hub half being fitted into the hub-like portion of the drum with their inner ends terminating in a common plane to present an annular abutment face of double thickness, the inner end of the right hub half being of greater diameter than that of the left hub half, a tubular filler section fitted into the inner end of the right hub half and terminating coplanar therewith to present an annular abutment face of double thickness which face is in register with, and of thickness and diameter substantially equaling that of, the first-mentioned face, the faces being in abutting relation, and a butt weld in the common plane directly securing the hub-like portion to the right hub half and the left hub half to the filler section.

6. A combined brake drum and bicycle hub according to claim 5 wherein the butt weld also welds the left hub half to the hub-like portion and the right hub half to the filler section.

7. A combined brake drum and bicycle hub comprising tubular right and left hub halves, a brake drum having a central inwardly extending hub-like portion, one hub half being fitted into the hub-like portion with its inner end terminating coplanar with that of the hub-like portion to present an annular abutment face of double thickness, an auxiliary tubular section in telescoping relation to the inner end of the other hub half and terminating coplanar to present a second inwardly facing abutment face of double thickness, the two faces being in substantially registering abutment, and a butt weld in the plane of the faces for uniting the drum, hub halves and auxiliary section together.

8. A combined brake drum and bicycle hub comprising tubular right and left hub halves, a brake drum having a central inwardly extending hub-like portion, one hub half being fitted into the hub-like portion with its inner end terminating coplanar with that of the hub-like portion to present an annular abutment face of double thickness, an auxiliary tubular section in telescoping relation to the inner end of the other hub half and terminating coplanar to present a second inwardly facing abutment face of double thickness, the two faces being in substantially registering abutment, and means, of the class comprising a fused metal joint, in the region of the faces for uniting the drum and its associated hub half to the other hub half and its auxiliary section.

9. A combined brake drum and bicycle hub comprising right and left sub-assemblies, one sub-assembly comprising a brake drum having a hub-like portion and a hub half fitted into the hub-like portion to provide a tubular inner end for the sub-assembly of double thickness, a two-part other sub-assembly, one part thereof being another hub half and the other part being an auxiliary tubular section fitting in telescoping relation within the other hub half to provide a tubular inner end for the other sub-assembly of double thickness, the inner end of one of said parts being of substantially the diameter and thickness of the inner end of the hub-like portion and positioned in endwise abutment therewith, and the inner end of the other part being of substantially the diameter and thickness of the inner end of the one hub half and positioned in endwise abutment therewith, and a joint of the class comprising welding and brazing uniting the hub-like portion and the one hub half to the respective said parts at said abutments.

10. A combined brake drum and bicycle hub comprising a tubular hub half, a brake drum having a central tubular hub-like portion with the hub half telescopically fitting therein the inner ends of the hub half and hub-like portion terminating at a common plane in an abutment portion of double thickness, a complementary hub half having at its inner end an abutment portion of diameter and thickness approximating that of the first-mentioned portion, the hub halves and the drum being co-axially disposed with their said portions abutted, and a butt weld at said common plane uniting the hub halves and drum.

11. A combined bicycle hub, brake drum and sprocket mounting comprising one tubular hub half, a brake drum having a central tubular hub-like portion into which the hub half is fitted with their inner ends terminating in an abutment of double thickness, a complementary hub half of turned stock co-axial with the drum and one hub half and comprising a spoke flange, a hub bearing seat, a sprocket mounting seat and an annular inner abutment, a tubular section interposed co-axially between said faces and itself having annular end abutments, and of diameter and thickness approximating those of the respective first two abutments, and joints of the class comprising welding and brazing uniting the tubular section to the hub end at one end abutment and the filler section to the hub half and hub-like portion at the end abutment.

12. The method of making a combined brake drum and bicycle hub which consists in drawing from sheet metal stock left and right tubular hub halves with belled ends to receive hub bearings, forming a central hub-like portion in a brake drum, fitting one of the hub halves into the hub-like portion with their inner ends substantially flush, and butt welding the inner end of the other hub half to the inner ends of the one hub half and hub-like portion.

13. The method of joining right and left bicycle hub halves and a brake drum having a central tubular hub-like portion into a unitary whole, which consists in inserting one of the hub halves into the hub-like portion of the drum to bring their ends substantially flush and present an annular inner abutment face of double thickness, fitting an auxiliary tubular section into telescoping relation with the inner end of the other hub half to present an abutment face of double thickness and of approximately a diameter and thickness of the first abutment face, placing the hub halves and drum in axial alignment with their said faces abutting, and butt welding them together at the interface.

14. In the manufacture of a combined brake drum and bicycle hub, the method of joining together a pair of right and left tubular hub halves and a brake drum having a tubular hub-like portion for mounting the brake drum upon one of the hub halves, which consists in inserting the one hub half into the hub-like portion with their inner ends substantially coplanar and presenting an inner abutment face of double thickness, mounting a ring on the inner end of the other hub half in telescoping relation thereto to provide an abutment face at the inner edge of double thickness and of thickness and diameter approximating that of the first-mentioned face, bringing the said parts into axial alignment with the two faces abutted together, and securing them together by a process of the class comprising welding and brazing, at the region of the interface.

15. The method of claim 14 wherein the process is the electrical butt welding at the plane of the interface and the butt welding also directly secures the drum to the one hub half and the auxiliary tubular hub section to the other hub half.

16. The method of forming a combined brake drum and bicycle hub which consists in inserting the inner end of a hub half into a tubular hub-like portion of the drum to bring their inner ends coplanar in an abutment face of double thickness, and electrically butt welding to said double thickness face the inner end of a tubular portion of a complementary hub half.

17. The method of making a combined brake drum sprocket mounting and bicycle hub which comprises pressing from sheet metal stock a brake drum with a central tubular hub-like portion and a tubular hub half belled at its outer end to receive a bearing its inner end being of a size to fit within the hub-like portion, inserting the inner end of the hub half into the tubular portion of the brake drum with their inner ends coplanar, turning from stock an opposite end for the hub to provide a sprocket mounting seat, a spoke flange, a hub bearing seat and, at its inner end, an abutment face of diameter and thickness approximating that of the abutment face presented by the inner ends of the hub half and hub-like portion, positioning the assembled drum and hub half and the hub end in axial alignment with a tubular filler section inserted therebetween with the end faces of the section in substantial registry with the respective first and second mentioned faces, and electrical butt welding at the respective interfaces to weld the hub end to the section and the section directly to both the hub half and hub-like portion.

18. A combined hub and brake drum unit for a bicycle wheel comprising axial left and right hub halves of tubular form belled at their outer ends to embrace hub bearings, a drum having a tubular hub-like portion, one of the hub halves having a telescopic fit within the hub-like portion, the inenr end of the other hub half being of diameter substantially that of the hub-like portion, the hub-like portion of the drum and the two hub halves being disposed with their inner ends abutting in a common plane, and a butt weld uniting them at said common plane.

FRANK W. SCHWINN.